T. SCHERF.
MACHINE FOR WEBBING OR REINFORCING FABRICS.
APPLICATION FILED MAY 18, 1916.
1,292,890.
Patented Jan. 28, 1919.
8 SHEETS—SHEET 1.
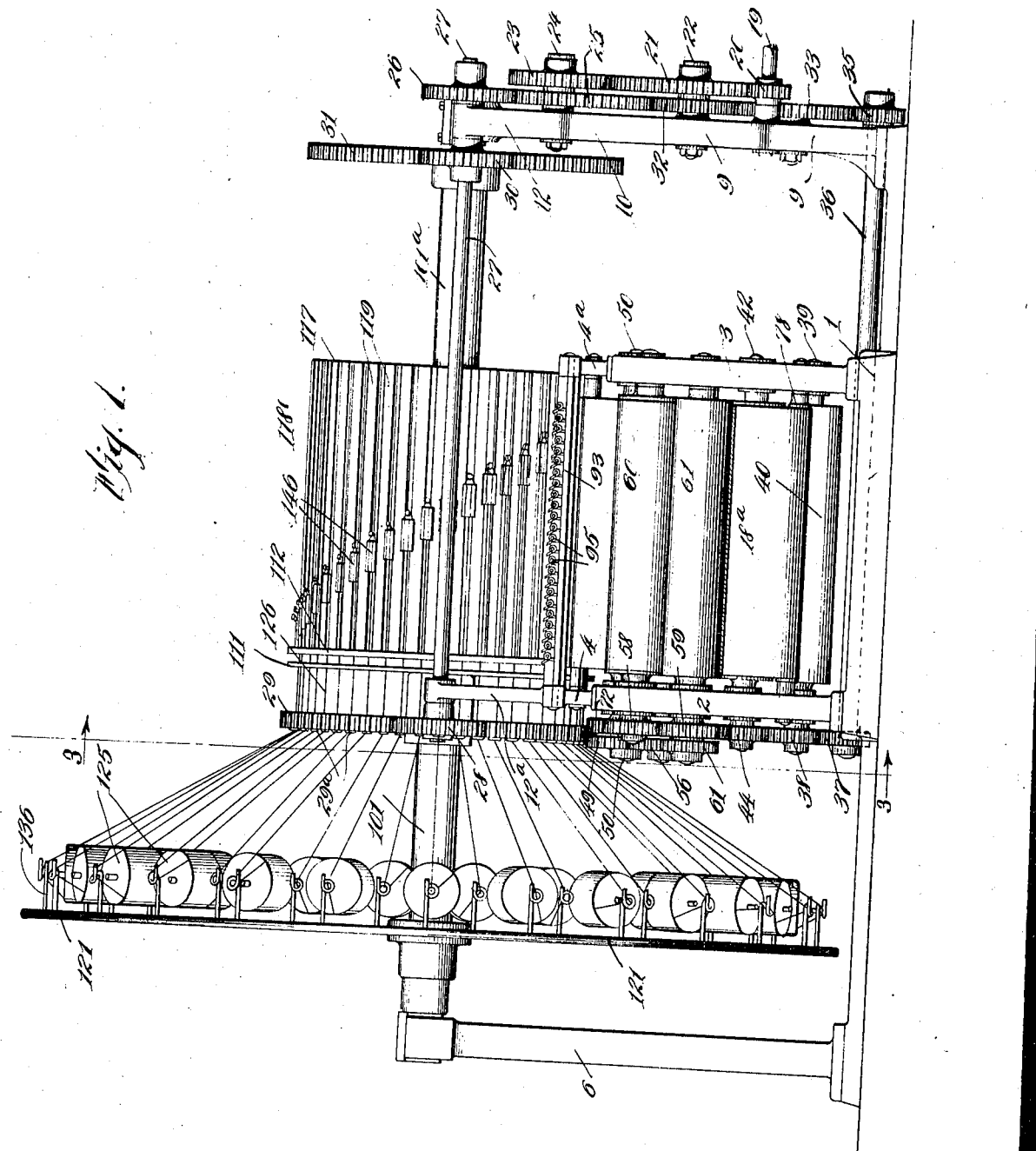

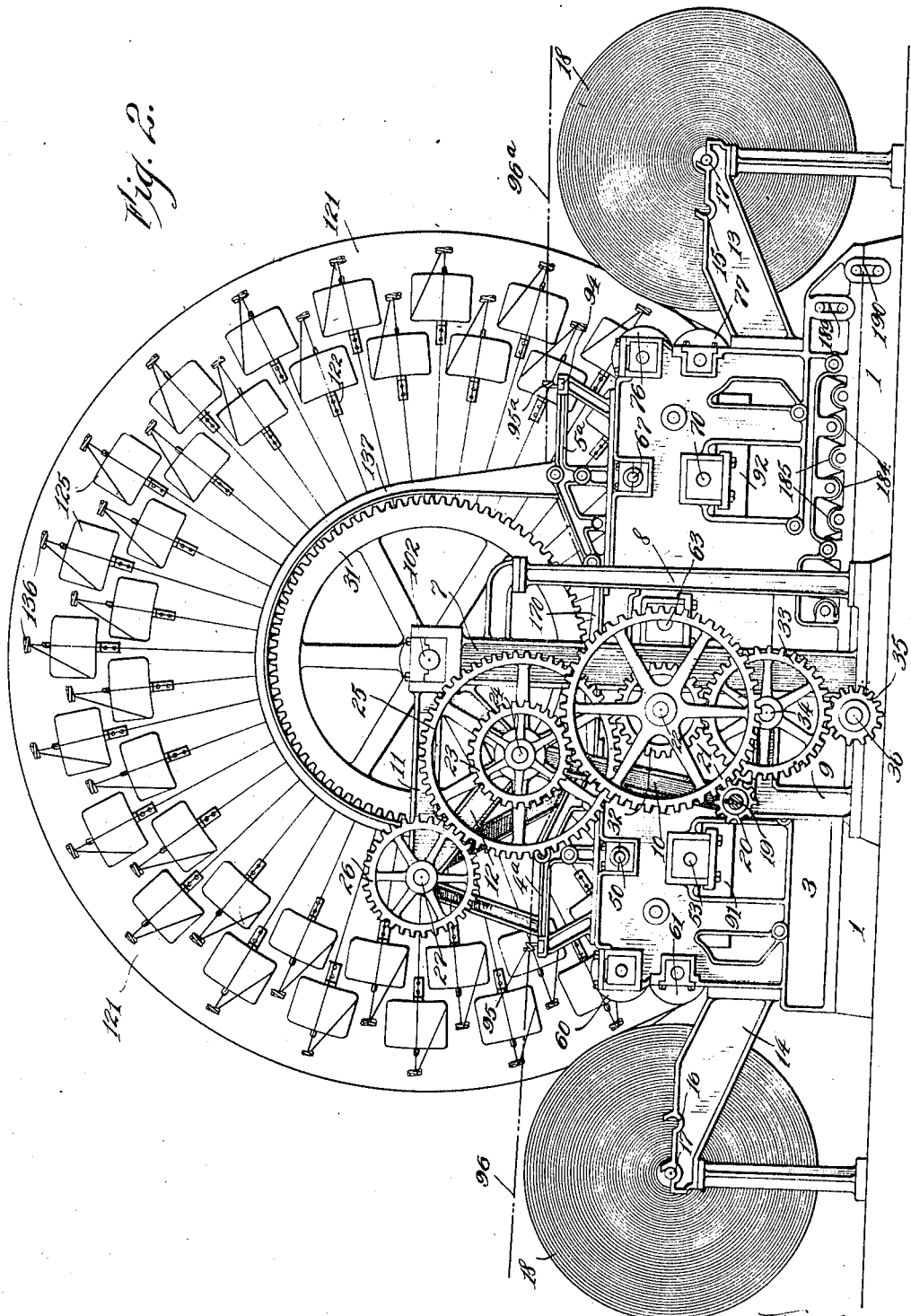

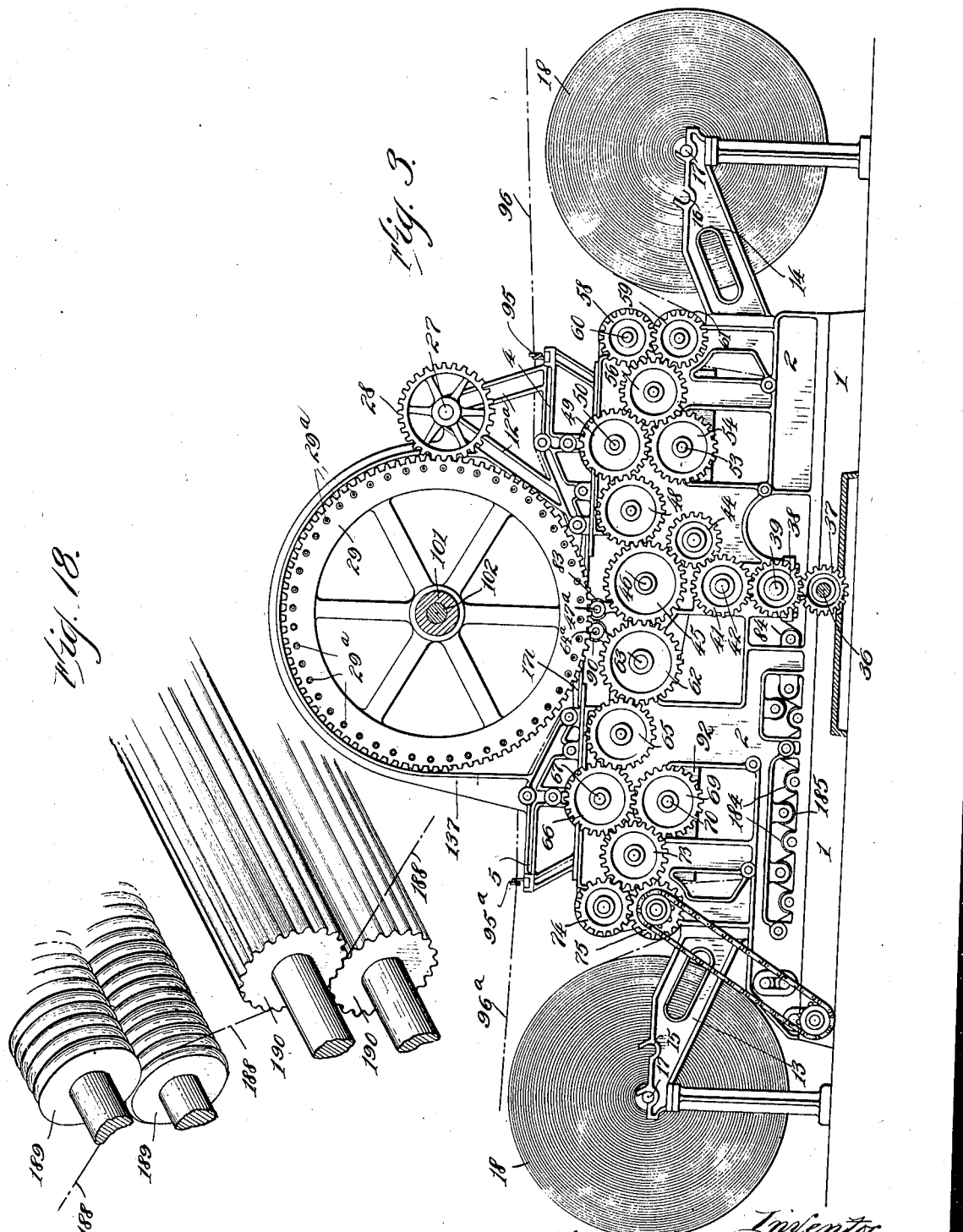

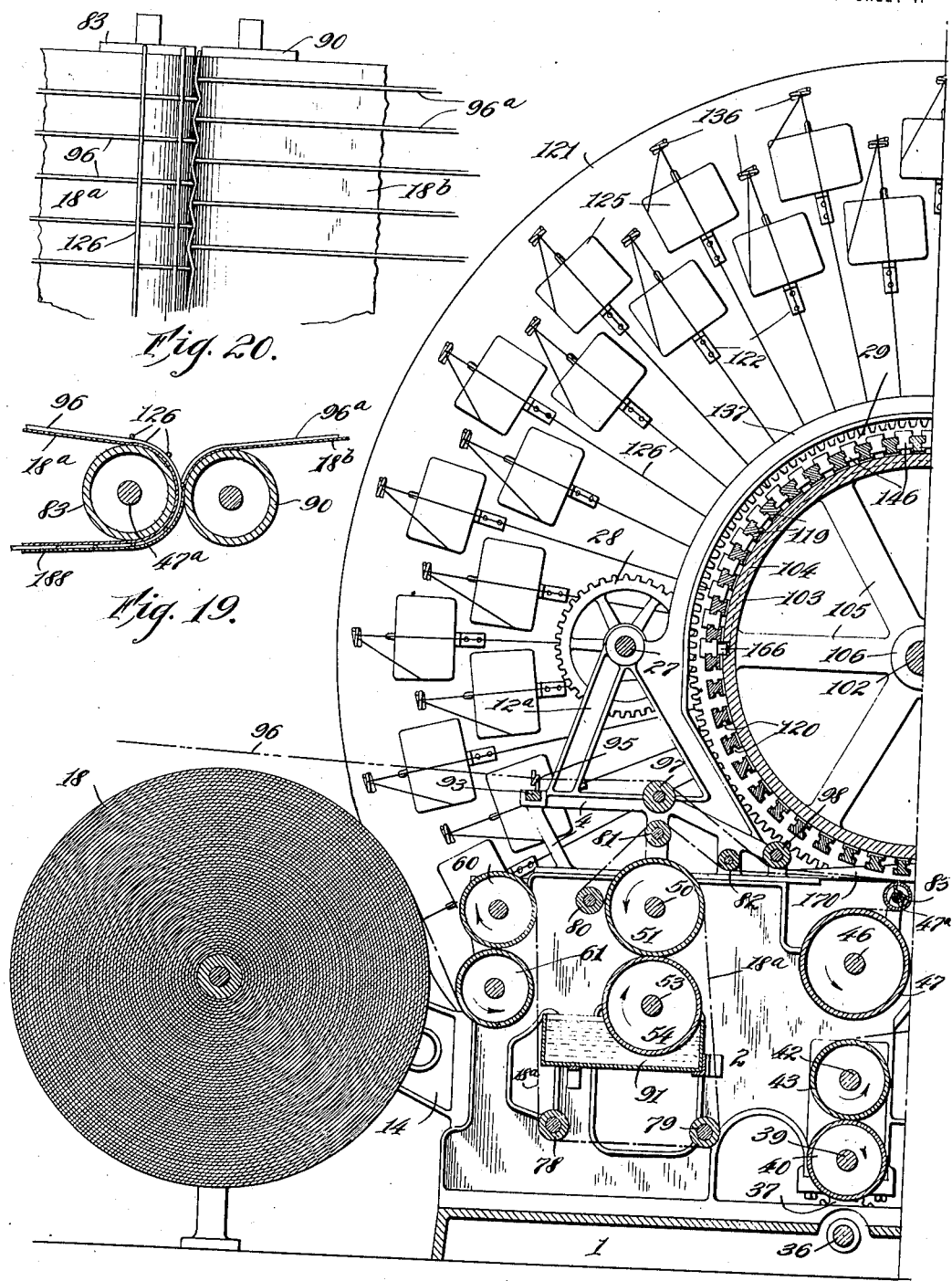

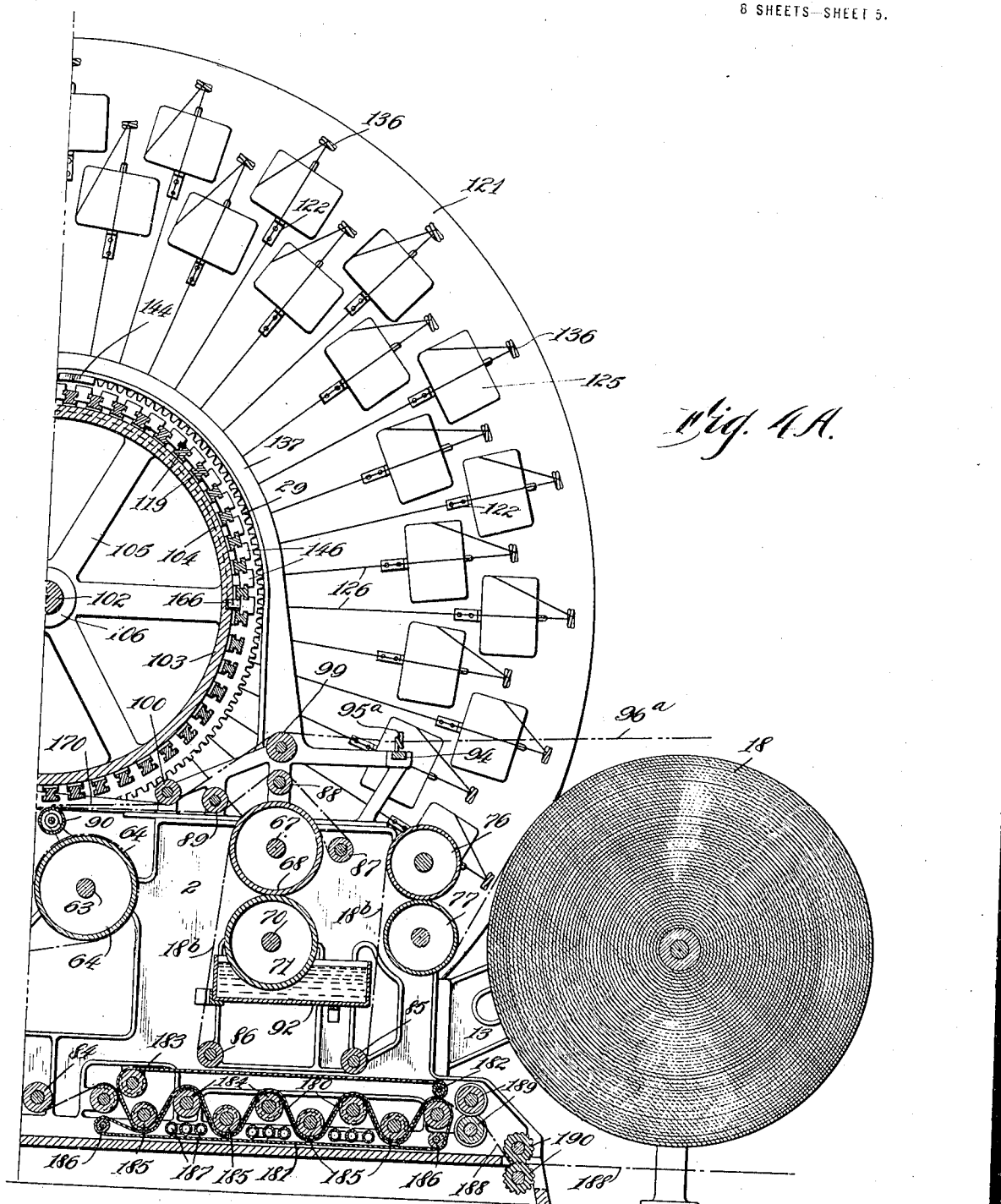

T. SCHERF.
MACHINE FOR WEBBING OR REINFORCING FABRICS.
APPLICATION FILED MAY 18, 1916.
1,292,890. Patented Jan. 28, 1919.
8 SHEETS—SHEET 7.
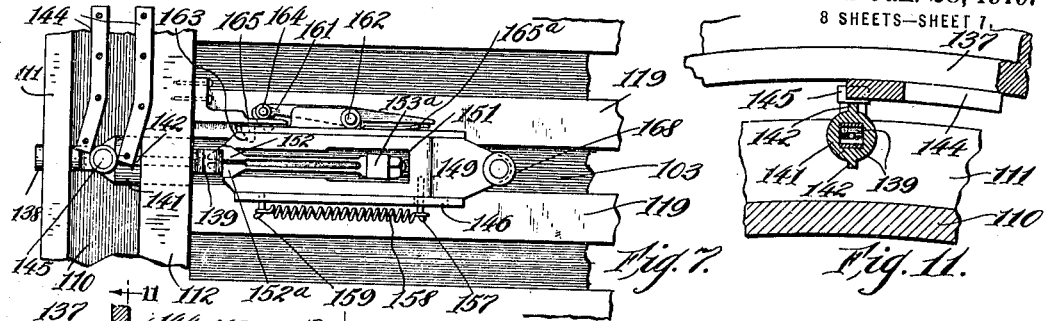
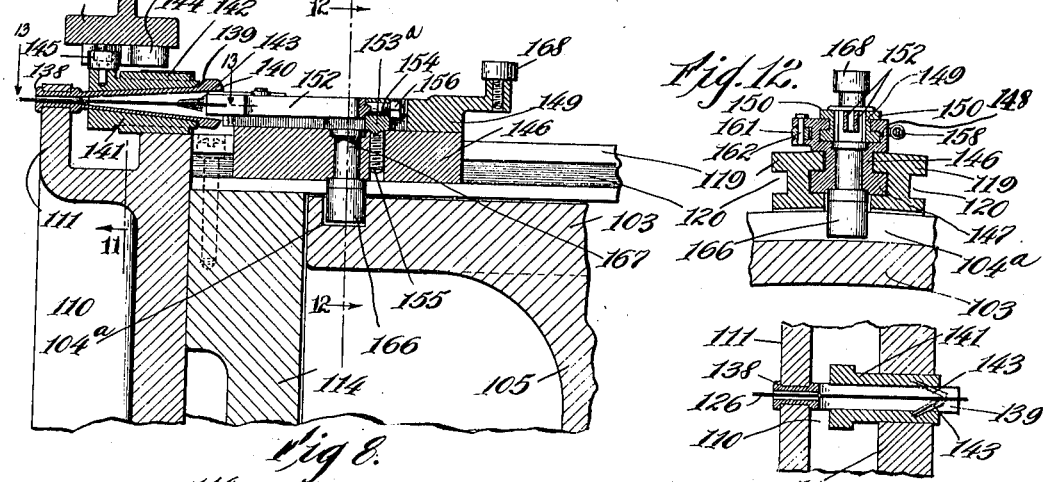
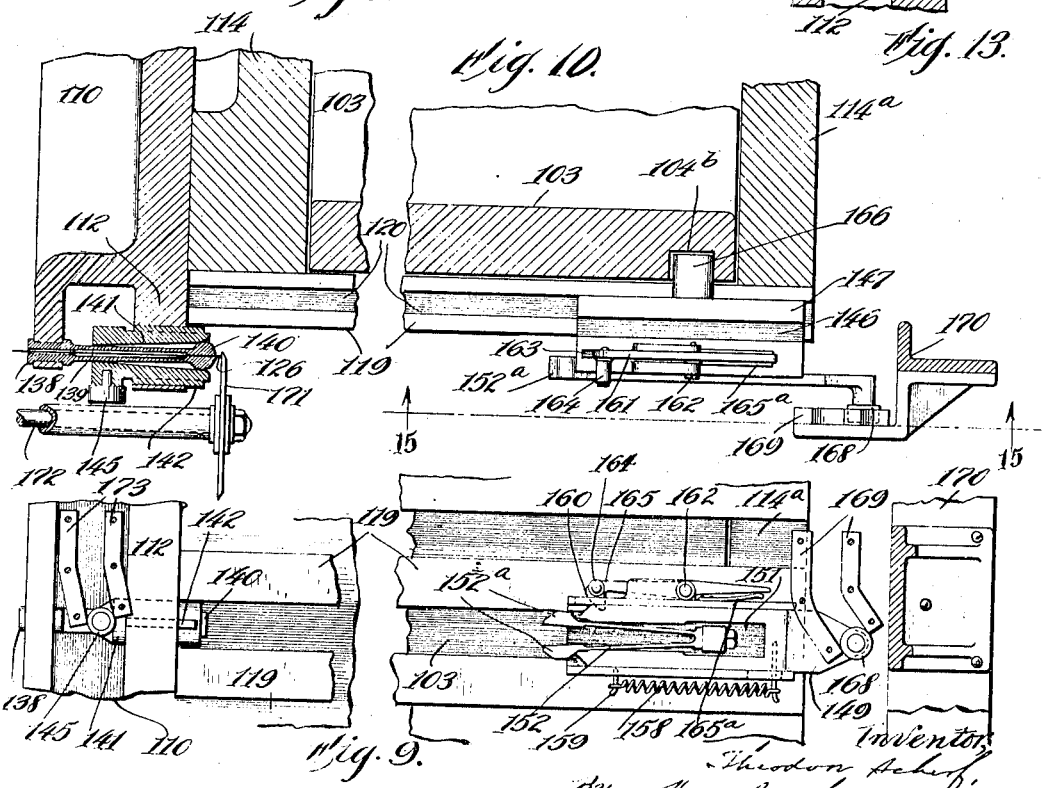

UNITED STATES PATENT OFFICE.

THEODORE SCHERF, OF CLEVELAND, OHIO, ASSIGNOR TO MARIE SCHERF, OF CLEVELAND, OHIO.

MACHINE FOR WEBBING OR REINFORCING FABRICS.

1,292,890.     Specification of Letters Patent.     Patented Jan. 28, 1919.

Application filed May 18, 1916. Serial No. 98,247.

*To all whom it may concern:*

Be it known that I, THEODORE SCHERF, a citizen of the United States, residing at Cleveland, in the county of Cuyahoga and State of Ohio, have invented a certain new and useful Improvement in Machines for Webbing or Reinforcing Fabrics, of which the following is a full, clear, and exact description, reference being had to the accompanying drawings.

This invention relates to apparatus for webbing or reinforcing paper by inserting threads between the plies thereof. Preferably combined with and operating in conjunction with this machine is mechanism for softening the paper after the webbing or reinforcing operation has been performed.

The general object of my invention is to provide a machine whereby the webbing or reinforcing operation may be accomplished far more efficiently than has heretofore been possible. Further and more limited objects of the invention will be set forth hereinafter and will be attained in and through the combinations of elements embodied in the claims hereto annexed.

Figure 5:
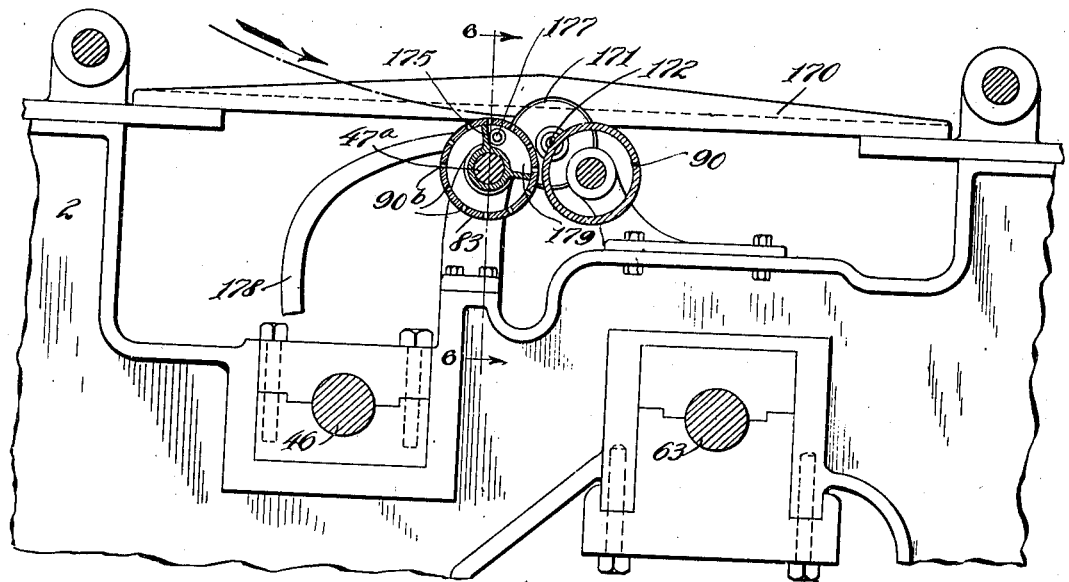
Figure 6:
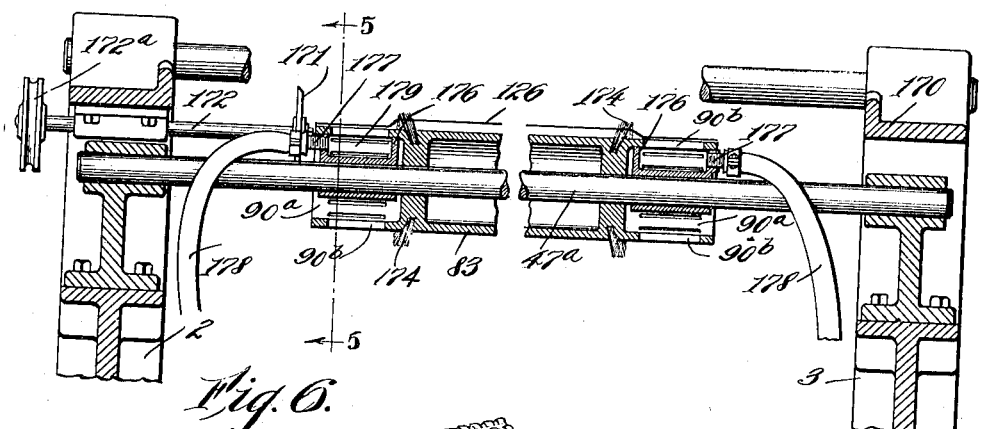
Figure 21:
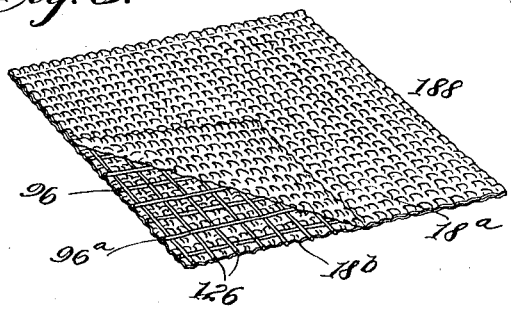
Figure 14:
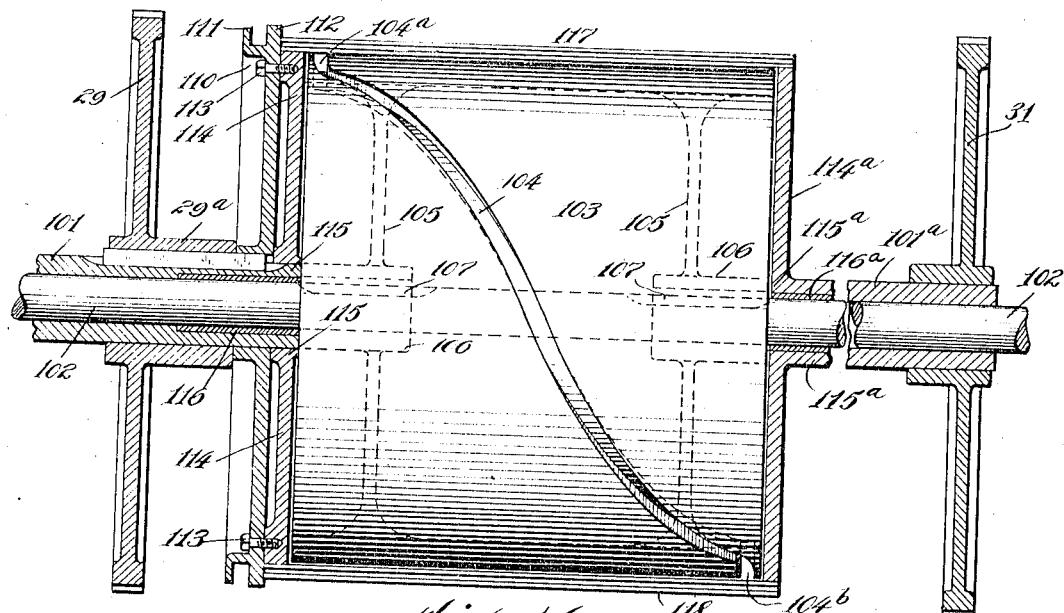
Figure 15:
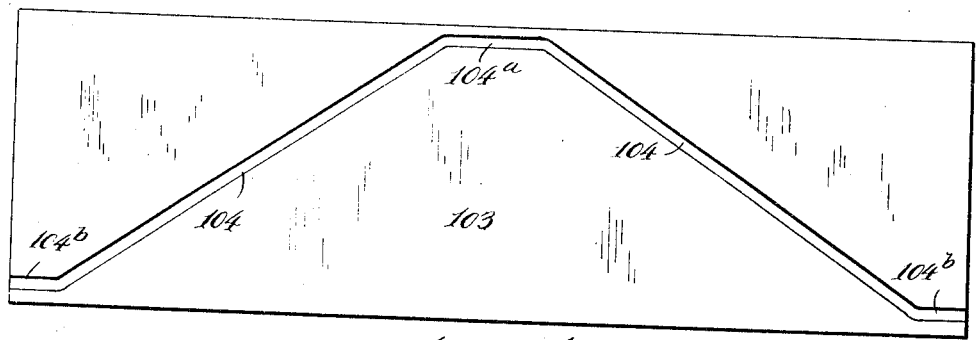
Figure 16:
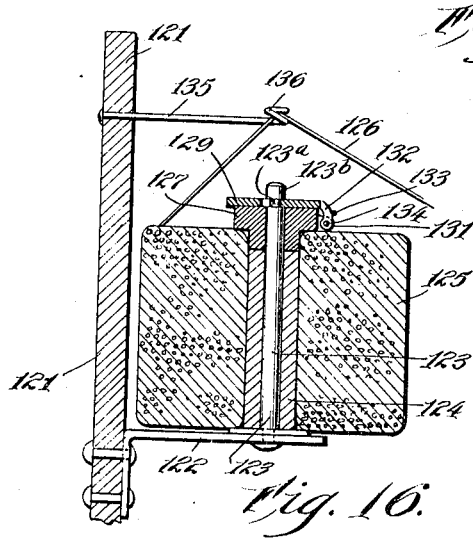
Figure 17:
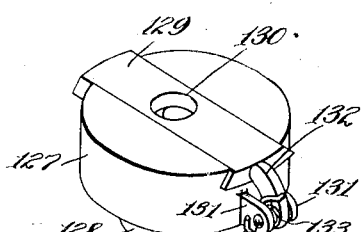

In the drawings forming part hereof, Figure 1 represents a side elevation of the machine, the paper supporting roll at such side being omitted; Fig. 2 is a rear elevation of the machine (taken from the right hand of Fig. 1); Fig. 3 a vertical sectional view corresponding substantially to the line 3—3 of Fig. 1, looking in the direction of the arrows; Figs. 4 and 4ª jointly show an enlarged vertical sectional view through the central part of the machine, looking toward the front thereof; Fig. 5 an enlarged sectional detail corresponding substantially to the line 5—5 of Fig. 6 and looking in the direction of the arrows; Fig. 6 an enlarged sectional detail corresponding substantially to the line 6—6 of Fig. 5; Fig. 7 a detail in plan of the upper part of the shuttle drum, the coöperating frame and one of the thread-handling devices showing the positions of the parts at the time when the shuttle receives the thread from a thread-holding and tensioning device; Fig. 8 a sectional detail through the parts illustrated in Fig. 7; Fig. 9 a bottom plan view of the drum and the coöperating parts, showing the positions of the parts when a thread has been cut and dropped; Fig. 10 a sectional detail taken through the bottom of the drum and the coöperating parts and showing the positions of the parts of the shuttle and the thread holding and tensioning device at the instant when the thread is cut; Figs. 11, 12 and 13 are sectional details corresponding respectively to the lines 11—11, 12—12, and 13—13 of Fig. 8; Fig. 14 is a side elevation of the cam drum, certain parts being shown in section; Fig. 15 is a development of the cam drum; Fig. 16 a sectional detail showing a spool support and tensioning device for the thread; Fig. 17 a detail in perspective of a portion of the spool support; Fig. 18 a detail in perspective of the paper softening rolls, one edge of the paper being indicated in dot-and-dash lines; Fig. 19 a sectional detail of the rolls which act upon and initially unite the two plies of paper and the interposed warp and weft threads; Fig. 20 a detail in plan of the parts shown in Fig. 19; and Fig. 21 a perspective view of a fragment of the paper produced by the machine.

The machine illustrated and described herein comprises generally means for feeding from opposite sides to the central portion thereof the two plies of paper to be united and the warps which are to be inserted therebetween; means for depositing between the converging sheets of paper and the interposed warps, at the central part of the machine, the weft threads; means for maintaining these weft threads substantially straight until the time they are severed and until they are pressed between the plies of the paper; means for uniting the two plies of paper with the interposed warps and wefts; means for partly drying the paste applied to and interposed between the plies of paper; means for pressing these plies firmly together without displacement of the threads; and means for softening the paper after the plies and threads have been so united and without breaking or cracking the paste.

Describing by reference characters the various parts illustrated in the drawings, 1 denotes a supporting base for the machine, said base having thereon the end frames 2 and 3 which support the major portion of the shafting, gears, etc., for the operating mechanisms. Each of these end frames is provided with bracket frames 4 and 4ª, respectively, at one side thereof and with similar bracket frames 5 and 5ª, respectively, at the opposite side thereof. Spaced from the frame 2 is a standard 6 which has a bearing for the shaft on which the shuttle drum is rotatably mounted. Spaced from the frame 3 is a frame comprising an upright 7 corresponding to the upright 6 and coöperating therewith to support the aforesaid shaft; also frame members 8, 9, 10, 11 and 12 (see Figs. 1 and 2) which are adapted to support certain driving mechanism and gear. At each side of the machine there is provided a pair of brackets 13 and 14, respectively, having laterally spaced bearings 15 and 16 for the shafts 17 of the paper rolls 18.

Referring to the vertical frame at the right hand of Fig. 1 and with particular reference to said figure and Fig. 2, 19 denotes the main power shaft, which may be driven in any desired manner, as by means of a motor (not shown). This shaft is provided with a pinion 20 meshing with a gear 21 on a stub shaft 22, the gear 21 meshing with a smaller gear 23 which is sleeved on a stud shaft 24. Projecting from the same sleeve as the gear 23 is a larger gear 25 meshing with a gear 26 keyed to a shaft 27 which shaft is supported in bearings carried by the frames 12 and 12$^a$ (see Figs. 1, 2 and 3). At its left hand end, the shaft 27 is provided with a gear 28 meshing with the large drum-gear 29. This gear is provided in its outer or rim portion with a circular series of apertures 29$^a$, for a purpose to be described hereinafter.

Coöperating with the gears 28 and 29 to drive the drum shaft are the gears 30 and 31, the former being of the same size as the gears 26 and 28 and being carried by the shaft 27 and the latter being the same size as the drum gear 28 being driven by the gear 30, thereby coöperating with the drum gear 29 to drive the drum through connections to be described hereinafter.

It will be seen that the right hand frame comprising the parts 7 to 12 inclusive supports the various gears whereby motion is transmitted from the main or power shaft to the rotary drum. This frame also supports the gearing whereby the shaft which drives the paper handling mechanism is in turn driven from the shaft 19. It will be observed that on the same sleeve as the gear 21 there is a pinion 32 which meshes with a gear 33 on the stub shaft 34, the gear 33 in turn meshing with a pinion 35 which is mounted upon and drives a shaft 36 (see Figs. 1 and 2). This shaft 36 is mounted in the lower portions of the frames 2, 3 and 9 and has at its left hand end (see Fig. 3) a pinion 37 meshing with a gear 38 on a shaft 39 said shaft carrying a drum or roller 40 (see Figs. 4 and 4$^a$). The gear 38 meshes with a gear 41 and thereby drives a shaft 42 carrying a drum or roller 43. The gear 41 meshes with an idle gear 44 which in turn meshes with a gear 45 and thereby drives the shaft 46 carrying the drum or roller 47. The gear 45 also meshes with two other gears one of which, 48, is an idle gear meshing with a gear 49 and driving through the shaft 50 a drum or roller 51. The gear 49 also meshes with a gear 52 thereunder, thereby driving a shaft 53 and a drum or roller 54 thereupon. The shaft 50 also drives, through a gear 55 thereon, an idle gear 56 which meshes with and drives in opposite directions the gears 58 and 59 mounted upon shafts and driving respectively the drums 60 and 61. Also coöperating with and driven by the gear 45 is a gear 62 driving a shaft 63 which carries a roller or drum 64. It will be observed (see Fig. 3) that the rollers 47 and 64 are pivotally supported at 47$^a$ and 64$^a$, respectively, thereby providing means whereby these rollers may be given a limited adjustment toward and from each other. The gear 62 also meshes with an idle gear 65 which in turn meshes with and drives a gear 66 rigidly connected to a shaft 67 and thereby driving a drum or roller 68. The gear 66 also meshes with a gear 69 rigid with a shaft 70 carrying a drum or roller 71. A gear 72 on the shaft 67 meshes with and drives an idle gear 73 which in turn meshes with and drives the gears 74 and 75 operating the rollers or drums 76 and 77 respectively.

Coöperating with the drums or rollers heretofore described are the idle rollers 78, 79, 80, 81, 82, 83, 84, 85, 86, 87, 88, 89 and 90. The idle rollers 78–83 coöperate to feed one ply of paper 18$^a$ from the roll 18 at one side of the machine to the central portion of the machine where it is united with the other ply; and the rollers 85–90 inclusive coöperate with the rollers at such other side of the machine to feed the other ply of paper 18$^b$ from the roll on that side of the machine to the central portion of the machine.

The rollers 54 and 71 dip into a body of paste contained, respectively, within the tanks 91 and 92 and each in coöperation with its adjacent roller 51 and 68 respectively, serves to apply paste to the appropriate side of the sheet or ply of paper with which the rollers coöperate.

Extending along each side of the central drum (to be described hereinafter) is a frame, the frames being indicated at 93 and 94 respectively—see Figs. 4, 4$^a$. Each of these frames carries a series of spring wire loops 95, 95$^a$, respectively, providing tensioning devices through which the warp threads 96, 96$^a$ are drawn. At the left hand side of Fig. 4, these warp threads are shown as being drawn over the idle roller 97, under the idle roller 98, and around the roller 83 over which the ply of paper 18$^a$ is drawn.

In like manner, the warps 96ᵃ at the right hand side of the machine are drawn through the tension loops 95ᵃ of the frame 94, over the roller 99, under the roller 100, and over the roller 90 together with the ply of paper 18ᵃ.

It will be observed that the warp threads which are fed from one side of the machine are staggered with respect to those which are fed from the opposite side of the machine and that the warp threads are spaced equidistantly apart, not only as they are fed from each side of the machine but as they are incorporated into the paper. This matter of applying warp threads to the plies of paper enables them to coöperate with the weft threads in such manner as to secure the locking together of both series of threads, in a manner to be explained hereinafter.

101, 101ᵃ denote hollow shaft sections which carry a rotatable shuttle drum and a spool carrying frame by means of which the wefts are deposited. These hollow shaft sections are mounted upon a non-rotatable spindle or shaft 102 and in suitable journal boxes carried by the uprights 6 and 7.

103 denotes a cylindrical cam having thereon a cam track 104 which extends diagonally of the cam from the top of the left hand (or thread-receiving) side of the weft feeding and distributing mechanism to the bottom of the right hand side and back, a development of the cam and its track being shown in Fig. 15. It will be observed that this track provides a comparatively long dwell 104ᵃ at the top of the cam and a like long dwell 104ᵇ at the bottom and discharge end of the cam. This cylindrical cam is secured to the shaft by means of spokes 105 and hubs 106, which hubs are keyed to the shaft 102 as indicated at 107—see dotted lines in Fig. 14. The gears 29 and 31 are secured to hollow shaft sections 101, 101ᵃ, respectively, that are rotatably mounted upon the shaft 102. The hub 29ᵃ of the gear 29 is extended and also carries an annular thread-receiving and tensioning frame 110 having a pair of peripheral radially extending flanges 111 and 112. The annular frame 110 is secured by suitable connections 113 to one of the two end frames 114 of the shuttle drum proper, this end frame being provided with a hub 115 which is journaled on the hollow shaft 101, there being a bushing 116 of anti-friction material interposed between the interior of the hub and said spindle, said bushing being extended to form an anti-friction bearing between the hollow shaft section 101 and said spindle. A similar end frame 114ᵃ at the opposite end of the drum is carried by the shaft sleeve 101ᵃ, there being a similar anti-friction bushing 116ᵃ interposed between the hub portion 115ᵃ of the sleeve 101ᵃ and the spindle 102.

The end frames 114 and 114ᵃ support the cylindrical drum proper 117. This drum is rotatable about the cylindrical cam 103 and is provided in its outer surface with a suitable number of longitudinally extending shuttle raceways, indicated generally at 118. The cylindrical portion of the drum may be conveniently made from a series of substantially I-shaped members 119 (see Figs. 4, 4ᵃ and 12) extending between and secured to the end frames, as this arrangement permits of easy machining of the parts to provide the raceways. It will be seen that each raceway is formed between a pair of substantially I-shaped members each having wide top and bottom flanges whereby channeled recesses 120 are provided between said flanges. The opposed channels and the opposed side flanges form retaining and guiding means for the shuttles. The bases of the I-shaped members or bars 119 are spaced apart thereby to provide passageways for the base extensions of the shuttles which operate in the slideways.

Also carried by the hollow shaft section 101 is a circular frame 121 which circular frame supports the spools carrying the weft threads. This frame is provided with a suitable number of spool carriers and tensioning devices one of such individual spool carriers and tensioning devices being shown in detail in Figs. 16 and 17. In these views, 122 denotes an angle plate or bracket shown as riveted to the frame 121 and having riveted thereto a spindle 123 carrying an anti-friction bushing 124. 125 denotes a spool having wound thereon the thread 126. This spool is somewhat longer than the bushing and, when applied thereto, projects therebeyond. For the purpose of detachably securing the spool to the spindle, I prefer to employ the clamp shown more particularly in Fig. 17. This clamp comprises a circular head 127 having a bushing section 128 coöperating with the bushing 124, the head overhanging the spool. This head is provided with a dovetailed recess extending centrally thereacross, this recess supporting a dovetailed clamping block 129 having an aperture 130 therethrough. At one side, the head is provided with a pair of lugs 131 to which there is pivoted a dog 132 the free end of which is adapted to engage the adjacent end of the clamping block 129. A spring 133 applied to the pivot 134 holds the end of the dog in engagement with the block 129 and tends to force the same along the guideway. The upper portion of the spindle 123 is provided with an annular recess 123ᵃ whereby the spindle 123 is provided with a head 123ᵇ at the end thereof. When the spool is applied to the bushing 124, the clamping head is inserted within the spool with the bushing portion 128 engaging the top of the bushing 124, the block 129 being meanwhile slid backwardly against the action of the spring-pressed dog so as to permit the head 123$^b$ to be projected therethrough. Then, by releasing the slide 129, the dog will press the slide to the position shown in Fig. 16 so that the rear side of the aperture 130 will engage the reduced portion of the spindle 123 between the head 123$^b$ and the portion therebeneath, thereby locking the clamping device in place upon the spindle.

Coöperating with each of the spool supporting frames and with each spool supported thereby is a tension device, conveniently formed by a spring wire 135 having a loop 136 through which the thread from the spool is passed. Each thread is then led from its tension loop 136 through an aperture 29$^a$ in the gear 29 to a holding and tensioning device carried by the frame 110, whence it is taken by the appropriate shuttle on the drum and conveyed, through the rotation of the drum, to the delivery end of the drum and there severed and dropped into the V-shaped space between the plies of paper that are conducted to this point. The holding and tensioning devices referred to are arranged around the periphery of the frame 110 and each is supported and operated by said frame, in conjunction with a substantially U-shaped frame 137 which extends about the upper part of the frame 110—see particularly Figs. 7, to 10 inclusive.

Each of the weft threads 126 is led through a bushing 138 carried by the flange 111. This bushing is provided with a pair of spring jaws 139 projecting therefrom and each having a rounded or inclined projection 140 at its free or outer end. These jaws, if unopposed, will open of themselves in the manner shown in Fig. 8. Each pair of jaws, however, is mounted within a sleeve or bushing 141 which is reciprocably mounted within the flange 112, the sleeve or bushing being provided with key projections 142 coöperating with corresponding slots in the flange whereby the parts are maintained in a definite relation to each other. The spring-engaging portions of the bore of the sleeve or bushing 141 diverge from the receiving toward the delivery end. From the portions of the bore of this bushing intermediate of the jaws there project toward the delivery end of the bushing a pair of brushes 143 (see Fig. 13), each brush being preferably formed of wire bristles, the brushes converging toward the delivery end of the sleeve or bushing and engaging the thread 126 so as to hold the latter under tension and prevent the portion of the thread adjacent to and beyond the brushes from dropping when the thread is severed.

In operation, the thread will be taken from each of the holding and tensioning devices when each such device is at the top and receiving end of the drum. At this time, the spring jaws must be open so as to permit the shuttle to take the thread. For the purpose of so opening the jaws, the frame 137 is provided, above the top of the frame 110, with a short cam track, the side members whereof are indicated at 144—see Figs. 7 and 8. The sleeve or bushing 141 is provided with a stud having a roller 145 which, as the drum rotates, passes along the cam track and, when the shuttle is in receiving position, the cam track will move the sleeve or bushing to the left, thereby permitting the jaws to open.

Coöperating with each of the thread-holding and tensioning devices is a shuttle which takes the thread from such device, conveys the thread to the delivery end of the drum, and automatically releases it when it is severed by a knife operating in connection with the said holding and tensioning device. Each shuttle is constructed substantially as follows:

146 denotes generally the shuttle body. This body is provided with outwardly projecting flanges 147 at the base thereof which flanges are adapted to slidably fit within the channels formed between a pair of I-shaped members 119. Above these flanges, the body is recessed to receive therewithin the opposed flanges of said members. The top or outer portion of the body 146 is provided with a guideway, the guideway being provided by a longitudinal slot in the top of the block or body which merges with a pair of opposed channel slots 148. Mounted in this guideway is a sliding block 149 the bottom whereof is provided with flanges entering the channels 148 and the top whereof is provided with flanges 150 adapted to rest on top of the shuttle body 146. The outer surface of the slide 149 is itself slotted, and mounted within this slot 151 is a pair of spring metal jaws 152 projecting forwardly from a common base 153$^a$ which is anchored to the block 146. This anchoring may be conveniently accomplished by providing the body 152 with a stud 153 adapted to receive a sleeve 154 and having a threaded extension 155 by which it is secured to the shuttle body. The end of the stem 153 is threaded and provided with a nut 156. It will be noted that the free ends of the jaws 152 are provided with inclined enlargements 152$^a$ which are adapted to be engaged by the ends of the slide 149. Means as follows are provided for automatically closing and releasing the jaws:—

157 denotes a pin carried by the slide 149 and projecting through a slot in the side of the body 146—the slot being indicated in dotted lines in Fig. 7. A coiled spring 158 connects the pin 157 with a pin 159 carried by the slide 149. When the spring is free to operate, it will move the slide to the position shown in Fig. 7, wherein its ends engage the inclined projections on the jaws 152 and thereby close said jaws. The front or receiving ends of the jaws 152 are intended to be inserted between the open ends 140 of the jaws 139. It is necessary that the jaws 152 be open when the shuttle reaches the delivery portion of the drum, and this opening is accomplished by means to be described hereinafter. In operation, however, the shuttle is brought to the receiving end of the drum with the jaws open, the jaws being held open by a detent 160 on the forward end of a trigger 161 which is pivoted to the side of the block 146, as indicated at 162. This detent may enter a notch 163 in the side of the slide 149 (said notch registering with a slot in the wall of the block 146) and lock the slide in its retracted position, the trigger being held in locking position by a spring 165$^a$. As the shuttle approaches the receiving end of the drum, a roller 164 on the front end of the trigger rides up an incline or cam 165 projecting from the flange 112 and releases the trigger, whereupon the spring 158 moves the slide forwardly and closes the jaws—as indicated in Fig. 7.

By the rotation of the drum, a shuttle (such as shown in Figs. 7 to 10 inclusive) will be carried to the bottom and delivery end of the drum with a weft thread 126 gripped between its jaws. The movement of each shuttle is due to the fact that the body or block 146 is provided with a roller 166 which projects into the cam track 104. This roller may be conveniently carried by a stud 167. On reaching the delivery end of the drum—see Figs. 9 and 10—the roller 168 on the slide 149 enters a short cam track the sides whereof are indicated at 169 and which may be conveniently carried by a bridge 170 at the top of the frame 3. This cam moves the slide rearwardly against the action of the spring 158 until the detent 160 on the trigger 165 can enter the corresponding notch in the slide. When the detent and notch register, the spring 165$^a$ will serve to lock the slide in its retracted position, the jaws 152 meanwhile opening on the retraction of the slide and remaining open until they are again closed through the action of the incline 165 on the roller 164 at the top and receiving end of the drum.

Meanwhile the thread-tensioning and holding device has been carried around simultaneously with the coöperating shuttle. Practically simultaneously with the opening of the shuttle jaws to release the thread, the thread will be cut adjacent to the holding and tensioning device by being moved across a knife 171 mounted upon a shaft 172 driven by a pulley 172$^a$ which may be in turn driven from any rotating part of the apparatus—65 see Figs. 6, 9 and 10. The travel of the unsevered thread is indicated in the dot and dash line in the first mentioned figure. As will be evident by an inspection of Figs. 5 and 6, each thread, before reaching the knife 171, will be engaged by the brushes 174 and the portions of the thread which extend beyond said brushes will at the same time be subjected to the suction created within the chambers 179. Therefore, when the thread reaches the knife 171, it is held against relaxing by the conjoint action of the brushes and the suction means. At the time of the severing operation, the jaws 139 and 152 should be closed, not only in order to secure a proper severing of the thread but in order to maintain the thread straight. The jaws 139 will therefore be automatically closed slightly in advance of the severing operation by a cam track, the sides whereof are indicated at 173, said track being conveniently carried by a bridge 170$^a$ at the top of the frame 2.

In the operation of the machine as thus far described, it will be apparent that the weft threads will be deposited between the two plies of pasted paper to which the warps have also been applied, the parts being so arranged that the threads will be severed and dropped into the V-shaped space provided between the plies of the paper as they pass over the rolls 83 and 90. The parts are timed, however, so that the weft threads will be dropped at one side of this space instead of directly into the apex thereof. The threads are deposited in this manner in order to maintain them straight until they are permanently positioned between the plies.

This manner of delivering the wefts is illustrated in Fig. 20, wherein the weft thread 126 at the left is one that has just been delivered by the shuttle and severing knife, the ones at the right being those which were delivered by the preceding shuttles and the severing device.

For the purpose of maintaining the threads straight when severed the roll 82 has associated therewith special means for accomplishing this object—see particularly Figs. 5, 6 and 20. At each side of the weft carrying part of this roll there is provided an annular brush 174, the bristles of each brush projecting outwardly or toward the outer end of the roll. These bristles are adapted to engage the thread 126 and will obviously retain it stretched if it is delivered thereto in a stretched condition. For the purpose of so delivering the thread, each projecting end of the roll is slotted and provided with a suction device which operates upon the ends of the threads immediately when each one is severed by the knife and released by the shuttle. The recessed ends of the roll are indicated at 90$^a$ and the slots therein at 90$^b$. Journaled on the shaft 47$^a$ in each chambered end of the roll 83 is a suction chamber comprised between side walls 175 and end walls 176, the outer wall having a connection 177 to which there is coupled a flexible tube 178, leading to any suitable suction creating means (not shown). There is thus provided a segmental suction chamber 179 within each slotted end of the roll 83. As the thread is severed at one end and released at the other, the suction through the chambers 179 and the slots 90ᵇ will hold the threads stretched and the thread will be carried in such straight and stretched condition into the V-shaped space between the two plies of paper, the surfaces of which have already been coated with paste and have received the warp threads. By inspection of Figs. 5 and 6, it will be noted that the extent and arrangement of each segmental suction chamber 179 is such that the threads will be subjected to the stretching or tensioning action from the time that they are delivered to the ply or sheet of paper above the roll 83 only until they are subjected to the pressing action of said roll 83 and the roll 90, at which time they are automatically relieved of the suction by passing beyond the zone of operation of the suction chambers.

As the paper, after receiving the warp and weft threads is carried between and around various rollers, there will be danger that the warp threads will be displaced through the pressure of the rollers operating upon the paste, especially if the paste possesses sufficient fluidity to be bodily displaced through the action of the rollers, thus causing the threads to "float". Accordingly the rollers 83 and 90 will be positioned only sufficiently close together to press the plies lightly together, and the final step of uniting the plies and the interposed threads will be accomplished by means of conveyer belts between which the paper is conducted and by means of which the plies are pressed firmly together and without tendency to displace the paste and to "float" the wefts. Furthermore, in order to reduce the fluidity of the paste, the paper during this operation will be subjected to the heating and drying action of a series of coils. This part of the apparatus is shown more particularly in Fig. 4ᵃ.

After passing under the roll 84, the paper is conducted between a pair of conveyer belts indicated respectively at 180 and 181. Each belt is preferably of the slatted type. The belt 180 passes over the rollers 182, 183, and around two series of staggered rollers, the rollers of one series being indicated at 184 and those of the other series at 185. The belt for the conveyer 181 passes around a pair of rollers 186 and, together with the belt 180, around the two series of rollers 184, 185. Under the hoods provided below the rollers 184, there are located heating coils 187 by means of which the paste is heated and dried to the proper consistency for the paper-softening operation. The use of slatted conveyer belts permits circulation of air between the slots, prevents the accumulation of steam between the plies of the paper, and facilitates the drying of the paste. The paste, for this purpose, should be sufficiently moist to enable the paper to be softened without breaking the paste but at the same time should not be so fluid as to move bodily and thus displace the weft threads.

After passing through and between the conveyers, the paper (indicated at 188) is led between the first pair of softening rolls—see Figs. 4ᵃ and 18. These rolls, indicated at 189, are transversely corrugated, whereby the paper will be correspondingly folded or corrugated longitudinally thereof. From these rolls, the paper passes between a pair of longitudinally corrugated rolls 190, whereby the corrugations formed in the paper by the rolls 189 are partly broken down and transverse corrugations are formed intersecting the first mentioned corrugations, the paper thus produced being shown in Fig. 21.

By the manner of applying the warps and wefts, the webbing or reinforcing threads are locked together, as will be plainly evident from an inspection of Figs. 19 and 20. Each weft will extend across both sets of warp threads and, as the warp threads of one set or series alternate with those of the other, the effect will be that each weft thread will, when the plies are united, be gripped alternately between a warp thread and the surface of the ply opposed thereto. By the term "thread" I do not propose to limit myself to any particular material, as it will be obvious that the thread may be made of paper; or, in fact, any other reinforcing or webbing strip or thread may be employed.

With the parts arranged and constructed as described, the operation will be briefly as follows: Paper will be fed from opposite sides of the machine to the rolls 83 and 90. Moving at the same speed with the paper are the warp threads, the warp threads being actually applied to the opposed coated plies of paper at the rolls 83 and 90. Meanwhile, through the rotation of the shuttle-carrying drum, the operation of the thread-holding and tensioning devices, the shuttles, and the coöperating cams, the weft threads will be fed from the spool carrying frame (which rotates with the drum) and carried to the positions indicated in Figs. 5, 6 and 20 and there severed and deposited in straight and parallel relation to each other upon the warps and between the plies of paper. From this point, the plies of paper will be firmly united to each other and to the threads and finally softened through the mechanism hereinbefore described.

As the shuttle approaches the receiving end of the drum the jaws are open in order to receive the end of the thread held by the corresponding holding and tensioning device. As these jaws enter the space between the jaws of the tensioning device, the incline 165 releases the detent 160 and the shuttle jaws are closed upon the end of the thread which projects beyond the brushes 143. As the drum rotates, carrying the spool frame and the thread holding and tensioning devices with it, the shuttles will be carried longitudinally of the drum to the delivery end thereof by the time that the shuttles reach the bottom of the drum. Just prior to the severing of the thread by the knife 171, the jaws 139 are closed upon the thread by the cam tracks 173, and the shuttle jaws are opened by the cam tracks 169 immediately at or after the severing operation. The thread, thus severed under tension, is held straight by the conjoint action of the brushes 174 and the suction chambers 179.

By changing the sizes of the gears 29 and 31 and of their driving gears, the speed of rotation of the shuttle drum may be varied, thereby spacing the weft threads closer or farther apart in the paper.

While the machine described herein is designed with special reference to the webbing or reinforcing of paper, and while the term "paper" will be employed in the claims hereto annexed, I do not thereby intend to be precluded from protecting the use of my machine in connection with the webbing or reinforcing of other material, nor limited to the use of any special kind of "thread" or reinforcing strips.

Having thus described my invention, what I claim is:—

1. In a machine of the character described, the combination, with means for moving or feeding plies or sheets of paper from opposite directions toward a common meeting line, of means for applying adhesive material to each of said plies or sheets in transit, means for feeding warp threads from opposite sides of the machine toward such meeting line, means for depositing weft threads between said plies or sheets, substantially at said meeting line, means for uniting at such meeting line the said plies or sheets and the warp threads, means for further uniting the said plies or sheets and their interposed warp and weft threads, means for partly drying the adhesive material interposed between the plies or sheets, and means for softening the paper thus produced.

2. In a machine of the character described, the combination, with means for moving or feeding plies or sheets of paper from opposite directions toward a common meeting line, of means for applying adhesive material to each of said plies or sheets, means for feeding warp threads from opposite sides of the machine toward such meeting line, means for depositing weft threads between said plies or sheets, substantially at said meeting line, means for uniting at such meeting line the said plies or sheets and the warp threads, means for partly drying the adhesive material interposed between the plies or sheets, and means for softening the paper thus produced.

3. In a machine of the character described, the combination, with means for feeding or supplying plies or sheets of paper in opposite directions toward a common meeting line, means for applying to each of said plies or sheets a coating of adhesive material while in transit, means for feeding or supplying warp threads from opposite sides toward such meeting line, means for depositing weft threads on one of said sheets in advance of the meeting line, means located at the meeting line for initially uniting the plies or sheets of paper and the interposed warp and weft threads, means coöperating with opposite sides of the sheet for pressing the plies together without imparting bodily movement to the interposed adhesive material and threads, means for partly drying such adhesive material during the last mentioned pressing operation, and means for softening the paper thus produced.

4. In a machine of the character described, the combination, with means for feeding or supplying plies or sheets of paper continuously in opposite directions toward a common meeting line, means for applying to each of said plies or sheets a coating of adhesive material while in transit, means for feeding or supplying continuously warp threads from opposite sides toward such meeting line and at the same speed as their respective plies or sheets of paper, means for depositing weft threads on one of said sheets in advance of and adjacent to the meeting line, means located at the meeting line for initially uniting the plies or sheets of paper and the interposed warp and weft threads, means coöperating with opposite sides of the paper for pressing the plies together without imparting bodily movement to the interposed adhesive material and threads, means for partly drying such adhesive material during the last mentioned pressing operation, and means for softening the paper thus produced.

5. In a machine of the character described, the combination, with means for feeding from opposite directions toward a common meeting line sheets or plies of paper, means for applying to each sheet or ply in transit a coating of adhesive material, means at the said meeting line for initially pressing together a pair of such opposed sheets or plies of paper, means for feeding or supplying from opposite sides toward the meeting line series of warp threads at substantially the same rate of speed as that of the sheets or plies of paper, the warp threads of one series being staggered with respect to those of the opposite series, means for delivering weft threads on one of said plies or sheets and on the warps applied thereto adjacent to such meeting line, means at such meeting line for initially uniting said plies or sheets of paper and the interposed warp and weft threads, means for maintaining the weft threads in a straight or stretched condition until subjected to the operation of such initial uniting means, means operating on opposite sides of the paper to press the sheets together without imparting bodily movement to the interposed adhesive material and threads, means for partly drying such adhesive material, and means for softening the paper thus produced.

6. In a machine of the character described, the combination, with a pair of opposed rolls and means for driving the same in reverse directions, of means for feeding a sheet or ply of paper to each of said rolls, means for applying adhesive material to each of said plies or sheets in advance of its reaching said rolls, means for applying to each of said plies or sheets a series of warp threads at substantially the same speed as the ply or sheet of paper, the threads of one series being staggered with respect to those of the other, a shuttle-carrying drum mounted above said rolls and extending in the same direction as said rolls, means for rotating said drum, shuttles on said drum, means for reciprocating said shuttles lengthwise of said drum, tensioning devices coöperative with said shuttles, means for severing the weft threads carried by said shuttles and said tensioning devices when each of said threads is above one of said rolls, means associated with such roll for keeping each weft thread in a stretched or straight condition, a pair of conveyers between which the paper passing through said rolls is conducted, means whereby the paper and the interposed threads and adhesive material will be subjected to pressure between said conveyers, means for partly drying the adhesive material while the paper is in transit between said conveyers, and means for softening said paper.

7. In a machine of the character described, the combination of a pair of opposed rolls, with means for driving the same in reverse directions, of means for feeding a sheet or ply of paper to each of said rolls, means for applying adhesive material to each of said plies or sheets in advance of its reaching said rolls, means for applying a series of warp threads to each of said plies or sheets, the threads of one series being staggered with respect to those of the other, a series of shuttles above said rolls, means for reciprocating said shuttles, tensioning devices coöperating with the weft threads carried by said shuttles, means for severing the weft threads, means for keeping each weft thread in a stretched or straight condition until deposited upon its ply or sheet, means for partly drying the adhesive material after the paper has passed between said rolls, and means for softening said paper.

8. In a machine of the character described, the combination, with means for feeding or supplying plies or sheets of paper from opposite directions toward a meeting line, of means for applying adhesive material to each of said plies or sheets in advance of reaching such meeting line, means for applying a series of warp threads to each ply of paper, the threads of one series alternating with those of the other, means for depositing between such plies and the warp threads a series of spaced weft threads, means whereby the width of the spaces between the weft threads may be varied, means for initially uniting the sheets or plies of paper and the interposed threads, means for permanently uniting such plies or sheets without displacement of the interposed adhesive material and threads, means for partly drying the adhesive material between such plies or sheets, and means for softening the paper thus produced.

9. In a machine of the character described, the combination, with means for feeding or supplying two plies of paper toward a common meeting line, of means for applying adhesive material to each of said plies or sheets, means for applying a series of warp threads to each of said sheets substantially at and in advance of said meeting line, the threads of one series being staggered with respect to those of the other, means for depositing weft threads between the plies of paper and the warp threads, and means for uniting said plies of paper and the interposed threads.

10. In a machine of the character described, the combination, with means for feeding or supplying to a common meeting line a pair of plies or sheets of paper, of means for applying to each of said plies or sheets a coating of adhesive material while in transit to said meeting line, means for supplying or feeding two series of warp threads toward said meeting line and at the same speed as imparted to the plies or sheets of paper, the threads of one series being staggered with respect to those of the other, means for applying a series of weft threads to a sheet or ply of paper at a point adjacent to said meeting line, and means for uniting the said plies and the interposed warp and weft threads.

11. In a machine of the character described, the combination, with means for feeding or supplying to a common meeting line a pair of plies or sheets of paper, of means for applying to each of said plies or sheets a coating of adhesive material while in transit to said meeting line, means for supplying or feeding two series of warp threads toward said meeting line and at the same speed as imparted to the plies or sheets of paper, the threads of one series being staggered with respect to those of the other, continuously operating means for depositing weft threads between said plies and the warp threads thereof, and means for uniting the said plies and the interposed warp and weft threads.

12. The combination, with means for applying adhesive material to two plies or sheets of paper, of means for applying to each of said plies or sheets a series of warp threads, the warp threads of one series being staggered with respect to those of the other series, means for applying weft threads between such plies of paper and the warp threads thereof, and means for uniting said plies and the interposed warp and weft threads.

13. The combination, with means for applying adhesive material to two plies or sheets of paper, of means for applying to each of said plies or sheets a series of warp threads, the warp threads of one series being staggered with respect to those of the other series, means for applying weft threads between such plies of paper, and the warp threads thereof, means for uniting the said plies and the interposed warp and weft threads, and means whereby the space between the weft threads thus deposited may be varied.

14. The combination, with means for feeding and coating with adhesive material two plies or sheets of paper, means for applying to each of said coated sheets a series of warp threads, the threads of one series being staggered with respect to those of the other, means for applying the weft threads between the plies or sheets of paper and the warp threads thereof, and means for uniting said plies or sheets of paper and the interposed threads.

15. The combination, with means for feeding and coating with adhesive material two plies or sheets of paper, of means for applying to each of said coated sheets a series of warp threads, the threads of one series being staggered with respect to those of the other, means for applying equally spaced weft threads in succession between the plies or sheets of paper and the warp threads, means whereby the speed of the weft applying means may be varied thereby to vary the width of the spaces between the wefts, and means for uniting the sheets or plies of paper and the interposed threads.

16. In a machine of the character described, the combination, with means for feeding to a meeting line two plies or sheets of paper and for applying adhesive material thereto, of means for applying warp threads to and between said sheets or plies of paper, and means for applying weft threads to and between said sheets or plies of paper and the warp threads, said means for applying weft threads comprising a rotatable drum located in operative relation to said meeting line, said drum having raceways extending longitudinally thereof, a cylindrical cam within the drum and having an inclined track extending from one end diagonally to the opposite end of the cam and back, shuttles having thread holding and releasing means mounted in the raceways and each having a projection within the cam track, a spool holding frame rotatable with the drum, spools carried by said frame, a thread holding and tensioning device interposed between each spool and each shuttle, said holding and tensioning devices being adapted each to receive and hold the thread led from a spool, said thread holding and tensioning devices being rotatable with the drum, means located adjacent to the meeting line for severing the threads, means whereby each shuttle may take a thread from its holding and tensioning device, means for releasing such thread when it has been severed, means associated with each tension device for holding the end of the thread therein in position to be grasped by a shuttle, and means for holding the severed threads substantially straight or stretched when severed and released until engaged between the plies of paper.

17. In a machine for feeding, severing, and applying threads, the combination of a rotatable drum having raceways extending longitudinally thereof, a cylindrical cam within said drum and having a track extending from one end diagonally to a point substantially diametrically opposite the first mentioned end and back, shuttles in said raceways each having a projection engaging said track, thread holding and tensioning devices coöperating with said shuttles and rotatable with said drum and located at the receiving end thereof, means rotatable with said drum for supplying thread to said devices, thread gripping and releasing means carried by each shuttle, means coöperating with the receiving end of the drum to cause the last mentioned means to grip a thread from its corresponding holding and tensioning device when a shuttle is at the receiving end of the drum, means at the opposite end of said drum and of the cam and coöperating with a shuttle to release the end of the gripped thread when the shuttle reaches the delivery end of the drum, means coöperating with the holding and tensioning devices to sever the threads carried thereby when the shuttle reaches the last mentioned position, suction means operating upon the ends of the severed and released threads, thereby to keep said threads straight, and means for applying such severed and released threads in succession to a sheet or ply of paper.

18. In a machine for feeding, severing and applying threads, the combination of a rotatable drum having raceways extending longitudinally thereof, a cylindrical cam within said drum and having a track extending from one end diagonally to a point substantially diametrically opposite the first mentioned end and back, shuttles in said raceways each having a projection engaging said track, thread holding and tensioning devices coöperating with said shuttles and rotatable with said drum and located at the receiving end thereof, means rotatable with said drum for supplying thread to said devices; thread gripping and releasing means carried by each shuttle, means coöperating with the receiving end of the drum to cause the last mentioned means to grip a thread from its corresponding holding and tensioning device when a shuttle is at the receiving end of the drum, means at the opposite end of said drum and coöperating with a shuttle to release the end of the gripped thread when the shuttle reaches the delivery end of the drum, means coöperating with the holding and tensioning devices to sever the threads carried thereby when the shuttle reaches the last mentioned position, a paper carrying roll having at opposite sides of the paper carrying portion thereof means adapted to frictionally engage the severed and released threads, and suction devices coöperating with the portions of the roll extending beyond such frictional means for operating upon the ends of the severed and released threads and to coöperate with such frictional means to retain the threads in straight or stretched condition.

19. The combination, with a pair of opposed rolls and means for feeding a sheet or ply of paper thereto, of brushes on one of said rolls located on opposite sides of the paper-carrying portion, with the bristles of each of said brushes projecting toward the outer adjacent end of the roll, the said roll being provided with perforated end portions and a suction chamber within each of such end portions and operating to exert a suction through the perforations in each of said end portions, and means for depositing threads under tension upon the brushes of the last mentioned roll with the ends of the threads extending along the perforated end portions thereof.

20. The combination, with a pair of opposed rolls and means for feeding a sheet or ply of paper thereto, of thread-engaging means on one of said rolls located at each side of the paper carrying portion thereof, the said roll being provided with perforated end portions and a suction chamber within each of such end portions and operating to exert a suction through the perforations in said end portions, and means for depositing threads under tension upon the thread-engaging portions of the last mentioned roll with the ends of the threads extending along the perforated end portions thereof.

21. The combination, with a pair of opposed rolls and means for feeding a sheet or ply of paper thereto, of suction means coöperating with one of said rolls beyond and at each side of the paper carrying surface thereof and arranged to operate upon the ends of threads deposited on said roll, and means for depositing such threads upon said roll and the paper thereon.

22. The combination, with means for applying adhesive material to plies or sheets of paper, of means for uniting said plies or sheets, said means including a pair of slatted conveyer belts, a horizontal series of rollers around which said conveyer belts extend, a second horizontal series of rollers around which said conveyer belts extend, the rollers of one series alternating with and projecting into the spaces between the rollers of the other series, means for delivering the plies of paper between the portions of the conveyers which coöperate with said rollers, and heating means arranged below the lower conveyers and beneath the upwardly projecting parts thereof.

23. The combination, with a reciprocable thread carrier having means for gripping and disengaging a thread, of a thread holding and tensioning device associated with said carrier, said device comprising a pair of jaws through which the thread extends, thread supporting means interposed between said jaws and adapted to support the thread when the jaws are open, and means for opening and closing said jaws.

24. The combination, with a reciprocable thread carrier having means for gripping and disengaging a thread, of a thread holding and tensioning device associated with said carrier, said device comprising a pair of jaws through which the thread extends, said jaws having closing projections thereon, a bushing reciprocable with respect to said jaws and adapted by a movement in one direction to engage the projections and close the jaws and by a movement in the opposite direction to release the jaws, and brushes carried on opposite sides of said bushing and between the jaws and projecting toward the ends of the jaws thereby to frictionally engage and support the thread within the jaws.

25. The combination, with a reciprocable thread gripping and releasing device, of a thread holding and tensioning device comprising a pair of jaws through which the thread gripped by the carrier is led, means for reciprocating the carrier, means coöperating with the said jaws to support a thread therebetween when the jaws are open, means for opening said jaws when the carrier is in thread receiving position, means adjacent to said device for severing the thread when the carrier has moved a predetermined distance therefrom, and means operating to close the jaws upon the thread substantially at and prior to the severing operation.

26. The combination, with a thread holding and tensioning device, of a reciprocable thread gripping and releasing device, means for reciprocating the last mentioned device toward and from the former, the last mentioned device comprising a reciprocable body, a pair of spring jaws connected thereto and having each a closing portion, a slide mounted on said body, means tending to operate said slide in a direction to engage the closing portions of the jaws, means operating the slide in the reverse direction to retain the jaws open, means automatically locking the slide in the last mentioned position, and means associated with the first mentioned device to unlock the locking means.

27. The combination, with a rotating frame, of a plurality of spool-supporting brackets thereon, each bracket having a pin, a bushing on said pin, a spool mounted on said bushing and extending therebeyond, and a clamping device for holding said spool in place, said clamping device comprising a head adapted to engage the end of said bushing, a slide mounted in said head and reciprocable thereacross and having an aperture adapted to register with the bushing bores, the pin having a notch adapted to be engaged by one side of the slide, and spring pressed means carried by the head and adapted to force the slide into such engagement with the pin.

28. In a machine of the character described, the combination, with means for feeding a sheet and means for applying adhesive material thereto, of means for applying reinforcing strips or threads to such adhesive-coated sheet, said last mentioned means comprising a cylindrical cam arranged in operative relation to the said sheet, said cam having a track extending diagonally from one end thereof to the other end and back, a drum rotatable about said cam, a plurality of thread feeding devices mounted in raceways on the drum and each having a projection operatively engaging the cam, and means coöperating with said drum and feeding devices for severing and depositing upon said sheet the threads carried by said feeding devices.

29. In a machine of the character described, the combination, with means for feeding a sheet, of means for applying reinforcing strips or threads to such sheet, said last mentioned means comprising a cylindrical cam arranged in operative relation to the said sheet, said cam having a track extending diagonally from one end thereof to the other end and back, a drum rotatable about said cam, a plurality of thread feeding devices mounted in raceways on the drum and each having a projection operatively engaging the cam, and means coöperating with said drum and feeding devices for severing and depositing upon said sheet the threads carried by said feeding devices.

30. In a machine of the character described, the combination, with means for feeding a sheet and for applying a coating of adhesive material thereto, of means for depositing on said sheet threads or strips for reinforcing material, said last mentioned means comprising a cylindrical cam arranged in operative relation to said sheet, said cam having a track extending diagonally from one end to the other thereof and back, a drum rotatable about said cam and having a plurality of longitudinal raceways, shuttles in said raceways and each having a projection adapted to enter the cam track, tensioning devices for the threads or strips carried by the shuttle, and means for severing the threads or strips and for delivering the same under tension to the sheet.

31. In a machine of the character described, the combination, with means for feeding a sheet, of means for depositing on said sheet threads or strips for reinforcing material, said last-mentioned means comprising a cylindrical cam arranged in operative relation to said sheet, said cam having a track extending diagonally from one end to the other thereof and back, a drum rotatable about said cam and having a plurality of longitudinal raceways, shuttles in said raceways and each having a projection adapted to enter the cam track, tensioning devices for the threads or strips carried by the shuttle, and means for severing the threads or strips and for delivering the same under tension to the sheet.

32. The combination, with means for applying adhesive material and reinforcing threads to plies or sheets of paper, of means for uniting said plies or sheets and the interposed threads, the last-mentioned means including a pair of conveyer belts between which the adhesive-coated and reinforced paper is delivered, a series of rollers around which said belts extend, a second series of rollers around which the said belts extend, the rollers of one series alternating with and projecting into the spaces between the rollers of the other series, and means coöperating with the paper-engaging portions of the belts for drying the paper and the adhesive material interposed between the plies or sheets thereof.

33. In a machine of the character described, the combination, with means for pressing together two opposed plies or sheets of paper and means for feeding such plies or sheets to such pressing means, of means for depositing between said plies or sheets, in advance of such pressing means, threads of predetermined length extending crosswise of said plies or sheets, and suction means operating upon the end portions of said threads to maintain the threads in a stretched condition or under tension until the plies or sheets shall have been subjected to such pressing means.

34. In a machine of the character described, the combination, with means for pressing together two opposed plies or sheets of paper having an interposed layer of adhesive material and means for feeding such plies or sheets to such pressing means, of means for depositing between said plies or sheets, in advance of such pressing means, threads of predetermined length extending crosswise of said plies or sheets, and suction means operating upon the end portions of said threads to maintain the threads in a stretched condition or under tension until the plies or sheets shall have been subjected to such pressing means, said suction means being rendered inoperative for said threads after the paper shall have been subjected to such pressing means.

35. In a machine of the character described, the combination, with a pair of opposed rollers and means for feeding thereto a pair of opposed plies or sheets of paper having adhesive material therebetween, of means for depositing upon one of said sheets, in advance of the pressure line between said rollers, threads of predetermined length extending transversely of said plies or sheets, and suction means coöperating with the opposite ends of one of said rollers to exert a suction upon the ends of the said threads as they are deposited upon the ply or sheet adjacent to said roller thereby to maintain the threads in a stretched condition or under tension, said suction means being located in advance of the meeting line between said rollers whereby the threads will be subjected to the action of said means only up to the time when the said sheets or plies are pressed together by said rollers.

36. In a machine of the character described, the combination, with means for pressing together a pair of opposed plies or sheets of paper and means for feeding to such pressing means a pair of such opposed plies or sheets of paper, of means for depositing between said plies or sheets, in advance of the pressing means, threads extending transversely of such plies or sheets, and suction means coöperating with the ends of said threads thereby to maintain the threads stretched or under tension, said suction means being arranged so as to be inoperative after the plies or sheets and the interposed threads shall have been subjected to such pressing means.

37. In a machine of the character described, the combination, with means for pressing together opposed plies or sheets of paper and means for delivering such plies or sheets to such pressing means and for depositing threads between said plies or sheets and in advance of such pressing means, of means located on each side of one of said sheets for frictionally engaging the end portions of the threads as they are deposited, and suction means also and operating upon the end portions of the threads thereby to maintain the said threads in a stretched condition or under tension until subjected to the pressing means.

38. The combination, with a pair of opposed rolls and means for feeding a sheet or ply of paper thereto, of suction means coöperating with one of said rolls beyond each side of the paper carrying surface thereof and arranged to operate upon the ends of threads deposited on said roll, said suction means being located in advance of the pressure line between said rolls, and means for depositing such threads upon said roll and the sheet or ply of paper thereon.

39. In a machine of the character described, the combination, with pressing means and means for feeding plies or sheets of paper thereto, of means for depositing weft threads between said plies or sheets, said means comprising a plurality of thread-holding and tensioning devices each having a pair of jaws, a friction device between the jaws of each such device adapted to engage the end of a thread, means coöperating with each of said thread holding and tensioning devices to grasp the end of a thread retained therein by the friction device, and means for severing the threads when they have been drawn through their respective holding and tensioning devices a predetermined extent.

40. In a machine of the character described, the combination, with pressing means and means for feeding plies or sheets of paper thereto, of means for depositing weft threads between said plies or sheets, said means comprising a plurality of thread holding and tensioning devices each having a pair of jaws having inwardly projecting brushes adapted to frictionally engage a thread drawn through such device, means coöperating with each of said thread-holding and tensioning devices to grasp the end of a thread retained by said brushes and to open and close said jaws, and means for severing the threads when they have been drawn through their respective holding and tensioning devices a predetermined extent.

41. In a machine of the character described, the combination, with pressing means and means for feeding plies or sheets of paper thereto, of means for depositing weft threads between said plies or sheets, said means comprising a plurality of thread holding and tensioning devices each having an inwardly projecting brush adapted to frictionally engage a thread drawn through such device, and means coöperating with each of said thread holding and tensioning devices to grasp the end of a thread retained by said brush.

42. In a machine of the character described, the combination, with a rotary drum, of a series of thread holding and tensioning devices at one end of said drum, thread-carrying shuttles mounted on said drum, and a member within said drum and having means coöperating with and adapted to reciprocate said shuttles in and through the rotation of said drum about said member.

43. In a machine of the character described, the combination of a rotary cylindrical drum having at one end thereof a frame, thread holding and tensioning devices mounted on said frame, a rotary spool carrier operatively connected to and rotatable with said drum and frame, said drum having longitudinal raceways coöperating with and extending from said devices, reciprocable thread-carrying shuttles in said raceways, and a cylindrical stationary member within said drum having means for reciprocating said shuttles in and through the rotation of said drum about said member.

44. In a machine of the character described, the combination of a rotary spool carrier having spools thereon, a drum rotatable about the axis of said carrier and having at one end thereof thread holding and tensioning devices corresponding to said spools and adapted to receive the threads therefrom, thread feeding devices mounted on said drum and reciprocable toward and from the first mentioned devices, means for rotating said drum and carrier, and means operative by such rotation for reciprocating the thread-feeding devices.

45. In a machine of the character described, the combination, with a rotary cylindrical drum, of a series of thread holding and tensioning devices at one end of said drum, thread carrying shuttles mounted on said drum and reciprocable longitudinally thereof, and a stationary cylindrical cam within said drum and having means coöperating with and adapted to reciprocate said shuttles in and through the rotation of said drum.

46. In a machine of the character described, the combination of a rotary drum having at one end thereof a frame, thread holding and tensioning devices mounted on said frame, a rotary spool carrier operatively connected to and rotatable with said drum and frame, reciprocable thread carrying devices on said drum, and a member within said drum having means for reciprocating said thread-carrying devices in and through the rotation of said drum about said member.

47. In a machine of the character described, the combination of a pair of opposed pressure members and means for supplying therebetween two plies or sheets of paper, means for supplying spaced weft threads under tension between said plies or sheets in advance of the pressure line between the said members, and brushes arranged to engage the portions of said threads that project beyond the planes of the sides of one of said plies or sheets.

48. In a machine of the character described, the combination of a pair of opposed pressure members and means for supplying therebetween two plies or sheets of paper, one of said members having brushes on opposite sides of the paper-engaging surface thereof, means for applying spaced weft threads under tension to said brushes and in advance of the pressure line between said members, and means for severing said threads after their engagement with said brushes.

49. In a machine of the character described, the combination of a pair of opposed pressure members and means for supplying therebetween two plies or sheets of paper, means for supplying spaced weft threads under tension between said plies or sheets, and suction means located on opposite sides of the paper engaging surface of one of said members and operating upon the portions of the threads projecting beyond such surface.

50. In a machine of the character described, the combination of a pair of pressure members and means for supplying therebetween a pair of plies or sheets of paper, means for feeding weft threads under tension between said plies or sheets and in advance of the pressure line between said members, brushes located on opposite sides of the paper engaging surface of one of said members and in advance of said pressure line and arranged to engage the portions of the threads projecting therebeyond, and suction means located outside of said brushes and operating upon the portions of the threads projecting beyond said brushes.

51. In a machine of the character described, the combination, with means for pressing together opposed plies or sheets of paper and means for delivering such plies or sheets to such pressing means and for depositing threads between such plies or sheets, of brushes located on each side of one of said sheets for frictionally engaging the end portions of the sheets as they are deposited, and suction means also operating upon the end portions of the threads thereby to maintain the said threads in a stretched condition or under tension until subjected to the pressing means.

52. In a machine of the character described, the combination, with means for uniting plies of paper, of a rotatable carrier, and means reciprocable with respect to said carrier for applying spaced threads between said plies.

53. In a machine of the character described, the combination, with means for uniting plies of paper, of means for applying warp threads between said plies, a rotatable carrier, and means reciprocable with respect to said carrier and actuated by the rotation thereof for applying weft threads between said plies.

54. In a machine of the character described, the combination, with means for uniting plies of paper, of a spool supporting means, a rotatable carrier connected to the spool supporting means, thread carrying devices reciprocably mounted on said carrier, and connections whereby the rotation of the carrier will reciprocate said devices.

55. In a machine of the character described, the combination, with means for uniting plies of paper, of a spool supporting means, a rotatable carrier connected to the spool supporting means, thread carrying devices reciprocably mounted on said carrier, thread tensioning devices interposed between the spool supporting means and the said thread carrying devices, and connections whereby the rotation of the carrier will reciprocate said devices.

56. In a machine of the character described, the combination of means for guiding material to be reinforced by transversely extending filaments and combined rotary and longitudinal moving means for drawing and distending the reinforcing elements transversely of the material and delivering said filaments directly to the material to be reinforced.

57. In a machine of the character described, the combination of means for guiding material to be reinforced by transversely extending filaments, a series of drawing and distending members, means for moving them longitudinally for drawing and distending a series of filaments in transverse relation to the material to be reinforced, and means for moving them transversely as they are moved longitudinally to deliver the filaments directly to the material to be reinforced.

58. In a machine of the character described, the combination of guiding means for material to be reinforced, longitudinally movable drawing means for drawing out filaments of reinforcing material, means for moving the drawing means in a curved path for conveying the filaments transversely toward and delivering them to the material to be reinforced, and means for releasing the filaments from the drawing out means only after they have been applied to the material to be reinforced.

59. In a machine of the character described, the combination of rotary means carrying a series of holders for reinforcing filaments, drawing and distending means for drawing filaments from the said holders and distending them transversely relative to the material to be reinforced, means for bodily moving the drawing and distending means transversely in a plane substantially parallel to the vertical plane passing longitudinally through the material to be reinforced, and separate means for imparting to the drawing and distending means their drawing and distending movements as they are moved in said plane.

60. In a machine of the character described, means for directing material to be reinforced, a series of drawing and distending members mounted for bodily movement in a curved path, means for moving said members longitudinally while being bodily moved for drawing and distending filaments transversely of the material to be reinforced and means for causing the drawing and distending members to deliver the transversely distended threads to the material to be reinforced and means for freeing the filaments from the drawing and distending members.

61. In a machine for reinforcing paper material, the combination of means for continuously feeding the material to be reinforced in a longitudinal direction, drawing or distending members mounted for bodily movement in a curved path, and means for moving said drawing or distending members progressively in a direction substantially at right angles to the bodily movement of said members for drawing or distending reinforcing filaments into transverse relation with the material to be reinforced.

62. In a machine for reinforcing paper material, the combination of means for continuously feeding the material to be reinforced in a longitudinal direction, drawing or distending members mounted for bodily movement in a curved path, means for moving said drawing or distending members progressively in a direction substantially at right angles to the bodily movement of said members for drawing or distending reinforcing filaments into transverse relation with the material to be reinforced, and means for transferring the reinforcing filaments from said members to the material to be reinforced.

63. In a machine for reinforcing paper material, the combination of means for continuously feeding the material to be reinforced in a longitudinal direction, drawing or distending members mounted for bodily movement in a curved path, means for moving said drawing or distending members progressively in a direction substantially at right angles to the bodily movement of said members for drawing or distending reinforcing filaments into transverse relation with the material to be reinforced, and means for pressing the distended reinforcing filaments into contact with the material to be reinforced.

64. In a machine for reinforcing paper material, the combination of means for continuously feeding the material to be reinforced in a longitudinal direction, drawing or distending members mounted for bodily movement in a curved path, means for moving said drawing or distending members progressively in a direction substantially at right angles to the bodily movement of said members for drawing or distending reinforcing filaments into transverse relation with the material to be reinforced, and means for introducing reinforcing filaments longitudinally of the material to be reinforced.

In testimony whereof I hereunto affix my signature.

THEODORE SCHERF.